United States Patent

[11] 3,607,782

[72] Inventor Shelvin Rosen
 Murraysville, Pa.
[21] Appl. No. 748,777
[22] Filed July 30, 1968
[45] Patented Sept. 21, 1971
[73] Assignee Emerson Electric Co.

[54] MOISTURE CONTENT INDICATOR FOR REFRIGERATION SYSTEMS CONTAINING COBALT-SUBSTITUTED SULFONIC ACID CATION EXCHANGER
13 Claims, 1 Drawing Fig.

[52] U.S. Cl. ................................................ 252/408,
 73/53, 73/73, 116/114.19, 260/2.2
[51] Int. Cl. ........................................... C08g 33/20,
 G01n 31/22
[50] Field of Search .......................................... 252/408;
 73/53, 73; 260/2.2; 116/114.19

[56] References Cited
UNITED STATES PATENTS

| | | | |
|---|---|---|---|
| 2,366,007 | 12/1944 | D'Alelio | 260/2.2 |
| 2,506,806 | 5/1950 | Metzger | 116/114 |
| 2,526,938 | 10/1950 | Davis | 252/408 |
| 2,761,312 | 9/1956 | Line | 73/53 |
| 2,836,974 | 6/1958 | Krause | 252/408 X |
| 3,084,658 | 4/1963 | Schell | 116/114 |
| 3,246,758 | 4/1966 | Wagner | 73/53 |

Primary Examiner—John T. Goolkasian
Assistant Examiner—M. E. McCamish
Attorney—Rogers, Ezell, Eilers & Robbins ABSTRACT: Cobalt-substituted sulfonic acid cation exchangers, the functional part of which is the sulfonic acid moiety which is uniformly distributed and supported on an organic base or matrix. The sulfonic acid cation exchangers may be polymers of the polyvinyl aryl type and particularly cobalt-substituted sulfonated polystyrene divinylbenzene copolymer type ion exchange resins which are used as moisture indicators by providing readily detectable color changes with increase and decrease of ambient moisture content. In particular, they can give readily detectable color changes in ambients with as low as a few parts per million of moisture. Different percentages of cobalt substitution may be used, the lower proportions of cobalt being more sensitive in the minimal moisture ranges. The material may be used loose or may be bonded into a separate matrix with some inert material by use of an appropriate binder such as an epoxy resin. The invention is especially applicable to detecting moisture in halogenated refrigerants in closed refrigeration systems in either liquid or vapor phases. It may also be used in other ambients having limited water solubility.

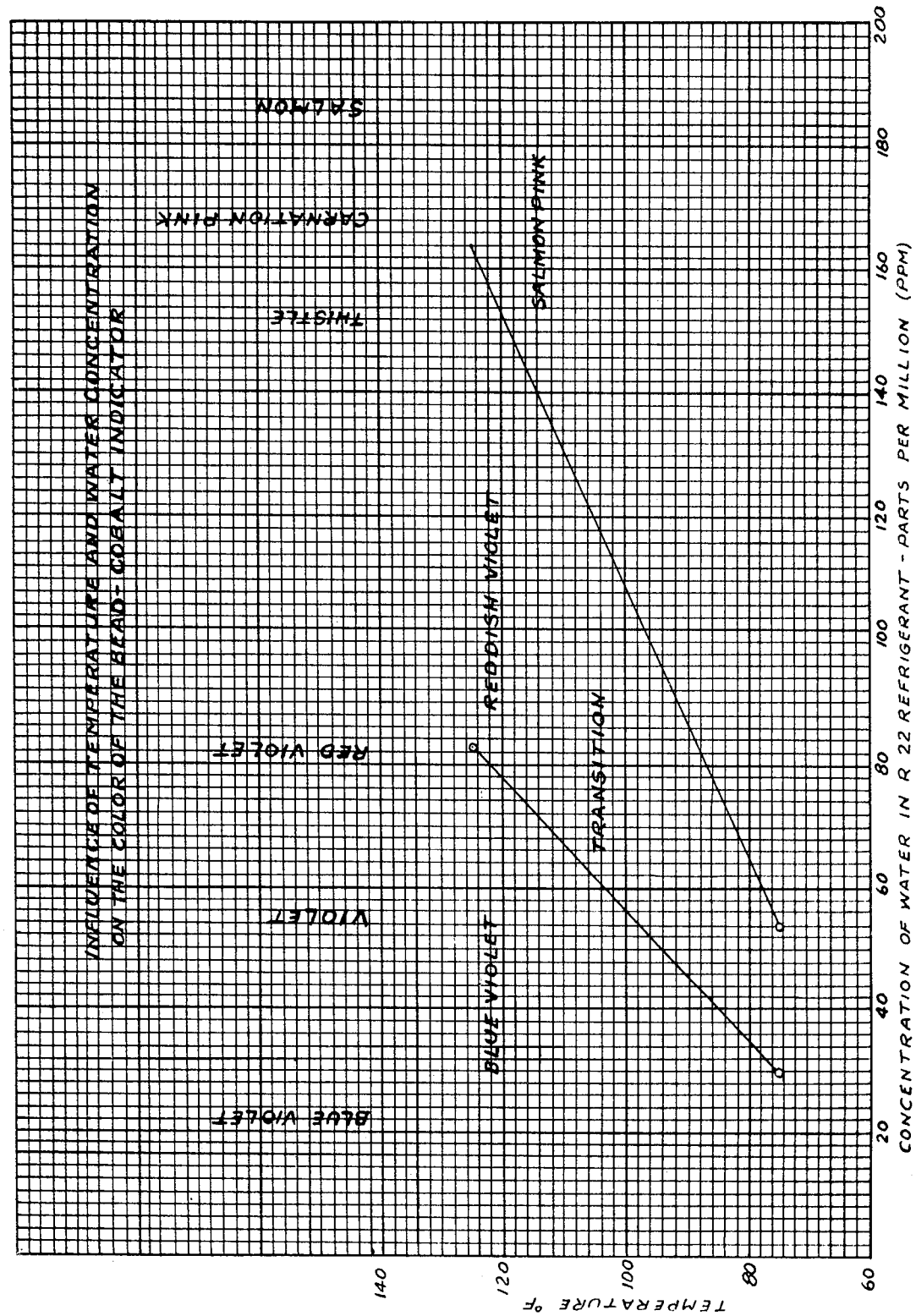

3,607,782

MOISTURE CONTENT INDICATOR FOR REFRIGERATION SYSTEMS CONTAINING COBALT-SUBSTITUTED SULFONIC ACID CATION EXCHANGER

SUMMARY OF THE INVENTION

The invention consists of a moisture indicator and a process of indicating moisture content of ambients by the use of cobalt-substituted sulfonated strong acid cation exchangers and particularly those polymers of the polyvinyl aryl type such as disclosed in U.S. Pat. No. 2,366,007 granted Dec. 26, 1944. Typical is the sulfonated polystyrene divinylbenzene copolymer, the same being used in loose or in bonded form.

The Disclosure

In the drawing is shown a chart of characteristic color changes with change in water concentration and temperature of a typical material made by the present process.

It has been known that different materials change color as the function of the degree of moisture present in their ambients. Various salts, particularly the cobalt salts as disclosed in U.S. Pats. Nos. 2,627,505, 2,761,312, and 2,836,974 have been used in the past. It has also been proposed to use synthetic zeolites (molecular sieves) as color indicators, since they have different colors in the anhydrous and moistened states. Specifically, silver, nickel- and cobalt- type A zeolites have been described for the purpose of moisture detection in a paper by Hybl and Jantula, published in Ropa a Uhlie, Vol. 4, Nov. 6, 1962, pp. 172–173. Variants of such materials are there discussed.

None of the prior art, however, has proved satisfactory or to work well enough for commercial application in such usages as the indication of moisture content in refrigeration systems using halogenated refrigerants. Efforts with other substituted metal ions in the materials discussed in the foregoing article have also failed to provide satisfactory indications.

As will appear, it has been found that cobalt-substituted sulfonic acid cation exchange resins do give satisfactory results with dependable, clearly distinguishable color changes for given changes in concentration of water within; for example, the ranges of operation of refrigeration systems where only very small amounts of moisture can be tolerated. The sulfonated polystyrene divinylbenzene copolymer resins have been found to be particularly useful.

One suitable strong acid cation exchanger that can be used when cobalt substitution is effected is known as Dowex 50, as sold currently by Dow Chemical Co. in various degrees of cross-linkage, although the other forms may be used. Another such commercial resin for purpose of example is the material known as Amberlite IR-120 sold by Rohm & Haas, which is of the so-called polystyrene sulfonic acid type.

These materials normally are obtained in the sodium or hydrogen form. Cobalt substitution may be easily effected. In the case of material received in the hydrogen form, it is usually more convenient to convert to the sodium form by neutralizing with sodium hydroxide and then substituting the cobalt for the sodium. One way of substituting the cobalt for the sodium is by ion exchange with a cobalt salt, such as cobalt sulfate. This may also be done directly with the hydrogen form. The ion exchange may be continued to completion, but this is not necessary in all cases as satisfactory indicators have been obtained with as low as about 15 percent cobalt substitution.

The material is in the form of beads, varying in size down to smaller than about 400 mesh. The mesh size has little effect upon the functioning of the material as a color indicator.

Typical material, as illustrated in the accompanying drawing, is of the Dow 50–X8 type substantially transparent beads. It responds to increasing water content by changing in color from a blue violet to violet to red violet to thistle to carnation pink to salmon pink. In this case it will be seen that there is a diminishing blue content as well as a paling out as the concentration of water increases.

The performance of the material is based upon an equilibrium reaction that occurs in a system wherein the solubility of water is limited. When the ambient is such that an equilibrium can be attained, the indicator material will have a specific color representing a certain percentage of saturation or relative humidity at a given temperature.

In the extremely dry state of 0 to 1 percent saturation in the ambient, the color is deep blue violet. As the percentage saturation increases, the color changes gradually with decreasing blue coloration to violet and at about 3 percent saturation to red violet. As the percentage of saturation rises about 3 percent, the color of the indicator changes from red violet to thistle to carnation pink and finally at about 5 percent saturation to salmon pink. The end point at about 5 percent saturation is in the general color range from carnation pink to salmon pink and as the percentage saturation increases further, the salmon pink color pales out.

The material may be used in a loose form. When used in a closed system such as a refrigeration system, it is preferable to have it in a self-supporting or self-contained unit. Accordingly, it may be enclosed or caged in a sight glass or may desirably be in the form of a solid matrix unit.

To provide the matrix, the material may be bonded into a block with a small quantity of binder such as polyvinyl alcohol or an epoxy resin. It may be desirable to provide inert material as a filler. For this purpose cotton or nylon fibers or other inert fillers may be used and thoroughly impregnated with the beads, which are preferably in small size of about 200 to 400 mesh. The binder and filler must be employed in such quantity and manner as to prevent coating the surfaces of the beads of the sensitive material so that they cannot respond to the moisture present. The inert material or filler may be as high as about 75 percent and the binder may be as high as about 15 percent.

The material may be coated, impregnated, or otherwise incorporated in paper, textiles and other materials. A paper impregnated with 50 percent of Amberlite IR-120 resin was obtained, and by ion exchange cobalt was substituted. This worked very well. A paper with only 5 percent Dowex 50–X8 resin also was effective but did not show the visual changes as clearly because of the limited quantity of resin. Apparently the factors involved are even distribution of the sensitive material throughout the paper or filler so that the particles of moisture will have an even and uniform opportunity to adsorb onto the sensitive material and sufficient quantity of the resin so that color changes are readily observed.

Various changes and modifications may be made within the process of this invention as will be readily apparent to those skilled in the art. Such changes and modifications are within the scope and teaching of this invention as defined by the claims appended hereto.

What is claimed is:

1. In a method of sensing the presence of moisture in a halogenated refrigerant wherein equilibrium conditions can be attained: the steps of interposing into the refrigerant to be tested, a mass of material that has predetermined color difference for different conditions of moisture in the refrigerant, for comparing the color of the material with its color under known moisture conditions, the material consisting essentially of a cobalt-substituted sulfonic acid cation exhanger.

2. In the method of claim 1: the material consisting essentially of a solid inert organic matrix, said matrix having uniformly distributed sulfonic acid groups at least part of the groups having cobalt as the cation.

3. In the method of claim 1: the material consisting essentially of a cobalt-substituted ion exchange resin of the sulfonated polyvinyl aryl type.

4. In the method of claim 1: the material consisting essentially of a cobalt-substituted ion exchange resin of the sulfonated polystyrene type.

5. In the method of claim 1: the material consisting essentially of a cobalt-substituted ion exchange resin of the sulfonated polystyrene divinylbenzene copolymer cobalt-substituted 6. In the method of claim 1, the steps including interposing a mass of the material in beadlike form down to about 400 mesh.

7. In the method of claim 1: including interposing the material in the form of a self-supporting blocklike mass, consisting essentially of beads of the recited material bonded together by a binder that does not destroy the ability of the material to adsorb moisture.

8. A water sensing material consisting essentially of a cobalt substituted ion-exchange resin of the sulfonated type, said sulfonated groups being permanently bound to a solid inert organic matrix, said matrix having uniformly distributed sulfonic acid groups at least part of the groups having cobalt as the cation, the cobalt substitution being at least about 15 percent complete and evenly distributed.

9. A water-sensing material of claim 8 consisting essentially of a cobalt-substituted ion exchange resin of the sulfonated polyvinyl aryl type.

10. The water-sensing material of claim 8 consisting essentially of a cobalt-substituted ion exchange resin of the sulfonated polystyrene divinylbenzene type.

11. The material of any one of claims 8, 9 and 10 wherein the cobalt substitution is substantially complete.

12. The material of any one of claims 8, 9 and 10, wherein the material incorporates a binder in the amount of up to about 50 percent of the weight of the material, and the material is bonded together into a unitary self-supporting mass.

13. The material of any one of claims 8, 9 and 10, wherein the material incorporates a binder in the amount of up to about 50 percent of the weight of the material, and the material is bonded together into a unitary self-supporting mass and the material includes an inert filler.